Aug. 6, 1935.    W. E. BUNTON    2,010,580
TEMPERATURE CONTROL FOR COOKERS
Filed Nov. 13, 1933
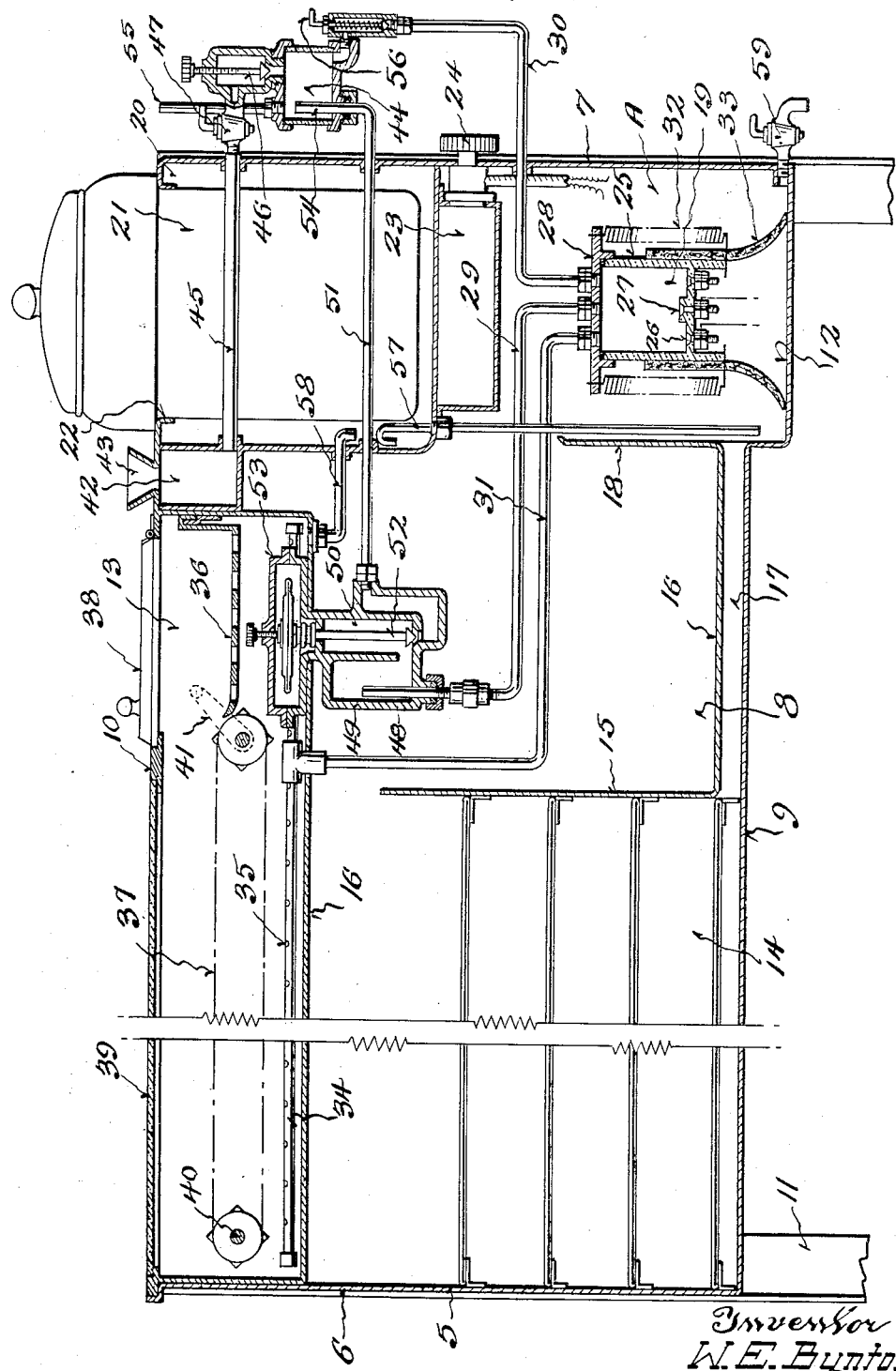
Inventor
W. E. Bunton Patented Aug. 6, 1935

2,010,580

UNITED STATES PATENT OFFICE 2,010,580

TEMPERATURE CONTROL FOR COOKERS

William E. Bunton, Janesville, Wis., assignor of one-half to Joseph L. Martin, Milwaukee, Wis.

Application November 13, 1933, Serial No. 697,815

5 Claims. (Cl. 219—37)

This invention appertains to food dispensing machines and more particularly to a novel device for cooking and keeping food products, such as sausages, tamales, meat cakes, etc., in a warm, palatable condition.

One of the primary objects of my invention is to provide food steamer and a roll or bun warmer for dispensing sandwiches or the like in lunch rooms and similar places in which the food cooked is kept at a predetermined temperature, whereby the repeated heating of the food after cooking for serving is dispensed with, thereby eliminating the loss of flavor and toughening of the food incident to repeated heating.

Another salient object of my invention is to provide an electric steam cooker and heater embodying novel means whereby the sausages and the like will not be exposed to the atmosphere and whereby the same can be readily cooked and maintained hot by steam, the device for generating the steam utilized in the cooker being so constructed that the same will consume a minimum amount of current.

A further important object of my invention is the provision of novel means for regulating the temperature for the cooking compartment, whereby the temperature is prevented from exceeding a predetermined degree and whereby the cooking chamber will be maintained substantially at a uniform temperature at all times.

A further important object of my invention is the provision of novel means for generating and supplying steam to the cooking and heating chamber, said means embodying an electric heating device and a novel water supplying device to said electric water heating means, the water supplying device delivering a predetermined amount of water to the electric heater, the water causing the circuit to be closed through the heater.

A further object of my invention is the provision of a thermostatically controlled valve for the water supply, so that when the temperature reaches a predetermined degree, the water supply will be automatically cut off and thereby temporarily preventing the further supply of steam to the cooking compartment.

A further object of my invention is the provision of a novel compartment arranged in the device for receiving the buns or rolls with novel means for supplying heated vapor generated by the electric heating device to the bun or roll compartment, whereby the buns or rolls will be maintained in a fresh heated condition.

A still further object of my invention is to provide an improved electric steamer and cooker of the above character, which will be durable and efficient in use, one that will be simple and easy to manufacture, and one which can be placed upon the market at a low cost.

With these and other objects in view, the invention consists in the novel construction, arrangement and formation of parts, as will be hereinafter more specifically described, claimed and illustrated in the accompanying drawing, in which:—

The figure is a vertical longitudinal section through my device, parts thereof being shown diagrammatically.

Referring to the drawing in detail, the letter A generally indicates my improved electric steaming device, which comprises an outer metallic casing 5 which can be ornamented in any desired way, such as by the use of enamel, porcelain or the like. This casing includes end walls 6 and 7, side walls 8, a bottom wall 9 and a top wall 10. Suitable supporting legs or standards 11 are arranged at the corners of the casing for supporting the same. The bottom wall 9 adjacent to the end wall 7 is provided with a depressed portion defining a water well 12, for a purpose which will be later set forth.

Arranged within the casing or housing is an upper steam cooking and heating compartment 13 and below the heating compartment is a second compartment 14 for the reception of rolls or buns. This compartment 14 may be defined by a transverse partition plate 15 which terminates short of the lower wall 9 and the top wall 10 of the heating and cooking compartment 13. Connected with the lower end of the transverse partition plate 15 is a horizontally disposed partition 16, which is arranged in spaced parallel relation to the bottom wall 9 and defines in conjunction therewith an air passageway 17. The other end of the partition plate 16 terminates in an upstanding partition wall 18 which forms in conjunction with the well 12 a compartment for the electric steam generating device 19.

From the description so far, it can be seen that the casing includes a cooking and heating chamber 13, a bun or roll compartment 14 and a heating compartment for the electric steam generating device 19.

The device may also include means for cooking and heating soups, chili con carne, and the like and thus, directly above the steam generating device 19 is a depending well 20 carried by the top wall 10 for the reception of a food receiving receptacle 21. This receptacle closes an opening 22 in said top wall and the well 20 is adapted to receive a certain amount of cooking water.

The temperature of the water can be effectively raised by an electric heating device 23 having a switch 24 for bringing the desired number of heating elements into play. In other words, the electric heater 23 can be formed to provide a low, high and intermediate heat.

The sausages, tamales or meat cakes are, as stated, to be cooked by steam generated from the electric device 19. This device 19 embodies a porcelain hollow body 25 having imbedded in its lower wall an annular electric conducting heat plate 26 and a raised central contact 27. The annular electric conducting plate 26 and the raised central contact 27 are provided with binding posts to which can be connected the electric feed and return wires. A removable top 28 is provided for the body and a gasket is interposed between the top and the body to prevent the leakage of steam. This top 28 can be supported in any preferred manner, such as by the water supply pipes 29 and 30 and a steam outlet pipe 31. The body 25 is held tightly against its top by means of contractile coil springs 32. These springs can also be employed for holding the tubular wick 33 around the body and this wick depends into the well 12 for a purpose which will be later more fully described.

The steam outlet pipe 31 leads to a manifold pipe 34 arranged in the cooking and heating compartment 13 and this pipe is provided with a plurality of steam outlets 35.

Arranged at one end of the cooking and heating compartment 13 is a stationary perforated tray 36 for receiving the sausages, hot tamales or meat cakes from the endless belt 37 from the heating device in which the food is cooked. The tray 36 is arranged directly below a small pivoted serving door 38 and by opening this door, the sausages can be readily removed for serving. As this door is relatively small, very little heat is allowed to escape.

A second larger door 39 is carried by the top wall 10 and is arranged above the endless belt 37 and is provided for the purpose of placing the sausages on said belt. This door is preferably formed from glass, so that customers can see the articles of food during the cooking process.

Obviously, the belt 37 can be constructed in any preferred manner, such as from a flexible thin metal and the same is perforated to allow the flow of heat therethrough. Rotatable supporting rollers 40 are provided for the belt and one of the rollers can have attached thereto an operating hand crank 41 arranged exteriorly of the casing, whereby the belt can be moved so as to automatically feed the cooked sausage onto the serving tray 36.

The means for supplying the water to the electric steam generating device 19 includes a reservoir or tank 42. This tank is arranged within the casing between the cooking and heating compartment 13 and the steam compartment 14. Consequently, the water in this tank is subjected to a preliminary heating process. A funnel 43 communicates with the tank to facilitate the pouring of water into the same.

Arranged exteriorly of the casing is a sight water feeding cup 44 and this cup can have its side walls formed of glass so that the height of water therein can be observed. A pipe 45 connects the tank with the upper end of the sight cup and an adjustable needle valve 46 can be provided for regulating the flow of water from the tank into the cup. If desired, a shut-off plug valve 47 can be incorporated in the length of the water feed pipe 45 for completely shutting off the flow of water from the tank to the casing of the needle valve, when necessary or desirable.

Below the cooking and heating compartment 13 is a casing 48 having a trap or water seal 49 therein. Communicating with the lower end of one leg of the trap is the water feed pipe 29 which communicates with the casing 25 of the steam generator 19. Communicating with the other leg of the trap is a valve casing 50 and communicating with the valve casing 50 is a water feed pipe 51 leading from the sight cup 44. Within the valve casing 50 is a thermostatically controlled valve 52 for regulating the flow of water from the casing 50 into the trap 49. The thermostatic portion of the valve is arranged within a suitable casing 53 disposed within the cooking and heating compartment 13 directly below the serving tray 36.

The pipe 51 carries a tube 54 which extends into the sight cup and this tube 54 is adjustable within certain limitations, so that the same can be set according to the desired height of water in the cup. A vapor escape pipe 55 can communicate with the upper end of the cup, if so desired.

In operation of my improved device, the water from the tank 42 will flow into the cup 44 and thence through the pipe 51 through the valve casing, trap 49, pipe 29 and into the heater casing. By regulating the needle valve a small quantity of water is allowed to flow into the casing 25 and this amount is sufficient to cover the raised contact 27 so as to form an electric conductor between said raised contact and the conductor plate. This water is quickly heated and changed into steam and the steam flows into the pipe 31 and out of the manifold pipe 34 under the sausages to be cooked. When the temperature within the cooking compartment 13 exceeds a predetermined degree, the thermostatic valve will be operated and further supply of water will be cut off. As soon as the temperature falls below a certain predetermined degree, the thermostat will contract and thus, unseat the valve and allow a predetermined quantity of water to again flow into the casing 25.

From the foregoing it can be seen that means is provided whereby a predetermined quantity of water is supplied to the electric heating device. Obviously, as soon as the water is turned into steam and the valve 52 is closed, the current is automatically shut off.

The trap 49 functions to prevent generated steam from flowing from the steam generator through pipe 51 to the reservoir or supply tank.

In some instances, where a higher temperature is initially desired after the valve 52 has closed, additional water is allowed to flow into the heater casing. This is brought about by the use of the pipe 30 which communicates with the lower end of the cup 44. A manually operable spring seated valve 56 controls the flow of water through the pipe 30 and when more water is desired in the casing 25, the operator merely pulls up on the valve 56. Upon release of the valve 56 by the operator, the same automatically returns to its closed position under influence of its spring.

An overflow pipe 57 is arranged within the bottom of the heating compartment 20 and this pipe extends into the well 12. Water for the heating compartment 20 can be supplied by means of a pipe 58 which communicates with the lower end of the cooking compartment 13. This pipe 56 collects water of condensation from the steam.

The water in the well 12 is attracted up and around the casing 25 of the electric heater by means of the tubular wick 33 and this water is turned into a warm vapor which circulates over the top of the wall 18 into the bun or roll compartment 14 and back into the compartment around the heater through the passageway 17.

Thus, the buns or rolls are kept in a warm, fresh condition. A suitable door, not shown, is provided for this bun and roll compartment.

A spigot 59 communicates with the compartment for the heater and thus, water can be drained from the system, when necessary.

My device is of a sanitary character, in that the water is used only once for cooking the sausages and the water of condensation is led into the well or compartment 20 for cooking the soup or chili con carne.

The device is especially economical to operate, in that low wattage electricity is used and then only used when the water comes into contact with the central contact 27 and the heating plate 26. Thus, there is no large body of water to heat, only the amount in the syphon or trap 49. The electric heating element will not burn out, in that as soon as the water is used, the current is automatically cut off. The device can be used in any community where electricity is available.

From a safety standpoint, the device is particularly desirable and the same will run as long as water and electricity is supplied and the same can be left without danger of burning out the compartments, for, as stated, the current is automatically cut off when the water supply fails.

If the electricity should be cut off for any reason and the thermostatic valve is left open, and the main valve 55 left open, the water will merely run through the heater 19 up through the steam supply pipe 31 into the cooker through the pipe 58 and thence into the well 12, which holds more water than the tank 42.

While I have shown the use of an endless belt, obviously, this belt can be replaced by a perforated plate, if such should be desired.

That part of the pipe 29 which extends into the casing 48 is made adjustable, so that the height of the pipe in said casing can be regulated. This will allow the operator to control (within certain limits) the drainage of water from the casing into the heater.

From the foregoing description, it can be seen that I have provided an exceptionally simple, economical and durable device for serving sausages and like sandwiches.

Changes in details may be made without departing from the spirit or the scope of this invention, but what I claim as new is:—

1. In a steam cooking and food warming device, a casing, a steam generator device, a cooking and warming chamber in said casing, a water supply tank, a sight cup having connection with said tank, a water supply pipe connecting the sight cup with the steam generating device, a water trap in the length of said last mentioned pipe, a thermostatically controlled valve responsive to the temperature of the cooking and warming chamber arranged in the length of said last mentioned pipe in advance of said water trap, and means for conducting the steam generated from the steam generator to the cooking and warming chamber.

2. In a steam cooking and food warming device, a casing, a steam generator device, a cooking and warming chamber in said casing, a water supply tank, a sight cup having connection with said tank, a water supply pipe connecting the sight cup with the steam generating device, a water trap in the length of said last mentioned pipe, a thermostatically controlled valve responsive to the temperature of the cooking and warming chamber arranged in the length of said last mentioned pipe in advance of said water trap, means for conducting the steam generating from the steam generator to the cooking and warming chamber, and a manually operated needle valve for controlling the flow of water from the tank to the sight cup.

3. In a steam cooking and food warming device, a casing, a steam generator device, a cooking and warming chamber in said casing, a water supply tank, a sight cup having connection with said tank, a water supply pipe connecting the sight cup with the steam generating device, a water trap in the length of said last mentioned pipe, a thermostatically controlled valve responsive to the temperature of the cooking and warming chamber arranged in the length of said last mentioned pipe in advance of said water trap, means for conducting the steam generating from the steam generator to the heating and cooking chamber, and manually controlled means independent of the last mentioned pipe and trap for supplying water from the tank to the steam generator.

4. In a steam cooking and food warming device, a casing, a steam generator device, a cooking and warming chamber in said casing, a water supply tank, a sight cup having connection with said tank, a water supply pipe connecting the sight cup with the steam generating device, a water trap in the length of said last mentioned pipe, a thermostatically controlled valve responsive to the temperature of the cooking and warming chamber arranged in the length of said last mentioned pipe in advance of said water trap, means for conducting the steam generating from the steam generator to the heating and cooking chamber, and means independent of the last mentioned pipe and trap for supplying water to the steam generator from the tank, said means including a manually operated valve.

5. In a cooking and warming device for food, a casing, a cooking and heating compartment in said casing, a roll compartment in said casing, a steam generator in said casing, means for supplying steam from the generator to the first mentioned compartment, the steam generator being disposed above a water well, a wick in said well surrounding the steam generator, and means for circulating heated vapors from the wick around the roll compartment.

WILLIAM E. BUNTON.